Jan. 19, 1971   E. P. ADCOCK ET AL   3,556,887
PRODUCTION OF LAMINATES
Filed July 18, 1967   3 Sheets-Sheet 1
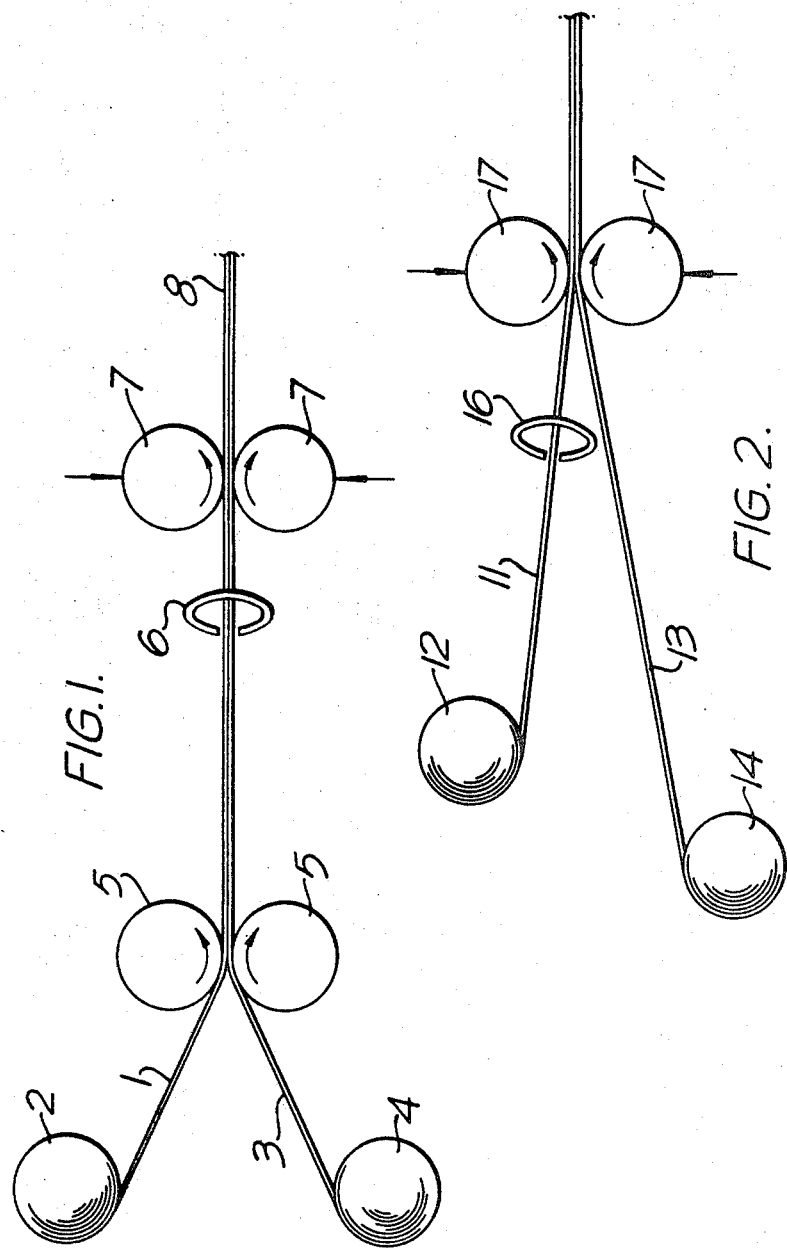
Inventors
Edmund Phillip Adcock
Joan Ann Stanley
By Cushman, Darby & Cushman
Attorneys

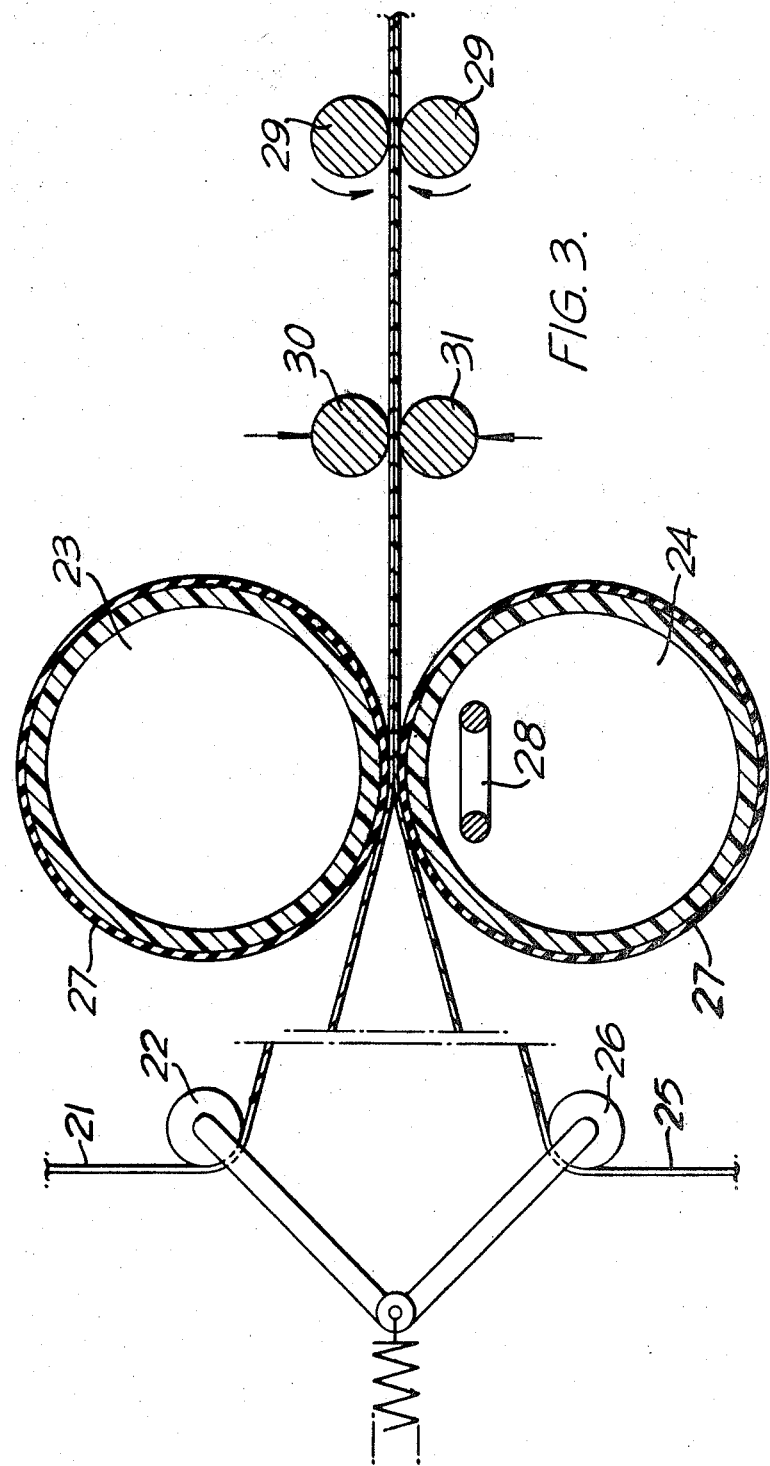

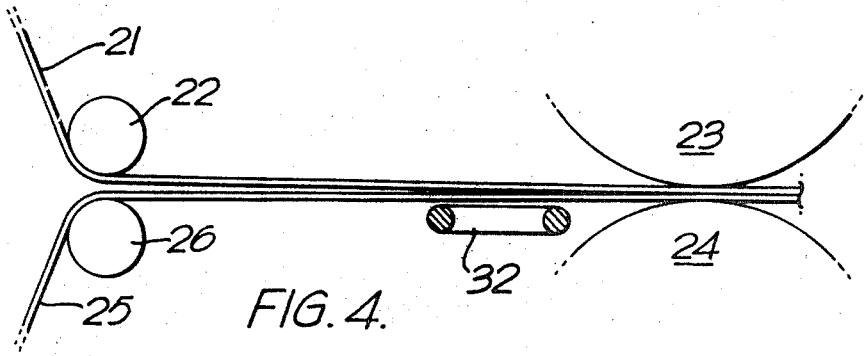
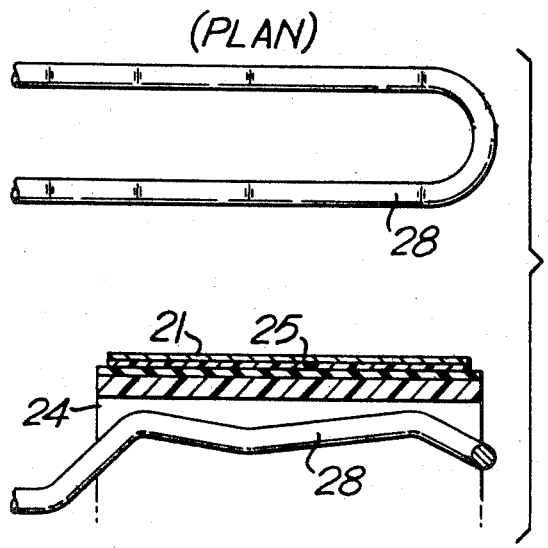

United States Patent Office 3,556,887
Patented Jan. 19, 1971

3,556,887
PRODUCTION OF LAMINATES
Edmund Philip Adcock, Harpenden, and Joan Ann Stanley, Dunstable, England, assignors to United Glass Limited, Staines, England, a corporation of the United Kingdom
Filed July 18, 1967, Ser. No. 654,130
Claims priority, application Great Britain, July 19, 1966, 32,399/66
Int. Cl. B29c 27/04
U.S. Cl. 156—272                14 Claims

ABSTRACT OF THE DISCLOSURE

A continuous process for the production of a laminate comprises continuously bringing a layer of a non-magnetic metal into contact with a layer of a thermoplastic material and pressing the layers together, the metal layer being heated by means of an induced radio frequency current to a temperature sufficient to cause the thermoplastic material to soften and thus adhere to the metal.

---

This invention relates to the production of laminates, and is especially concerned with the continuous production of thin, flexible laminates formed from metals and thermoplastic materials.

Laminates consisting of a sheet of metal, e.g. aluminium, foil united to a sheet or film of a thermoplastic material, e.g. polyethylene, are known, and three main methods are known for producing such laminates, viz the extrusion coating method, the roller coating method, and the adhesive bonding method. In the extrusion coating method a sheet of the metal foil is passed beneath an extruder having an elongated head, and molten thermoplastic material is extruded onto the metal foil from the head. As the foil passes horizontally beneath the extruder head a layer of thermoplastic material is united with it. In the roller coating method the thermoplastic material is applied to the metal sheet in the form of a solution or dispersion, and the solvent or dispersing medium is thereafter heated off to leave a layer of thermoplastic material united to the metal sheet.

Both of these methods suffer from the disadvantage that they can only produce layers of thermoplastic material which are very thin, and in fact the maximum thickness of the thermoplastic material obtainable in laminates made by these processes is about 0.002 inch. If it is required to produce a laminate having a thicker thermoplastic material layer than that quoted above, it is necessary to build up a number of layers of thermoplastic material, one upon the other, and unite adjacent layers. In the third method the foil is coated with an adhesive layer which bonds to the thermoplastic sheet under the pressure of nipping rollers. Any reasonable thickness of thermoplastic may be used, but the process is slow and one of the rollers may need to be heated, which involves the further difficulty of accurately controlling its temperature.

It is an object of the present invention to provide a continuous method for producing a metal-thermoplastic material laminate which is simple, speedy and efficient, and which may be used to produce laminates having a comparatively thick layer, e.g. of the order of 0.02 inch and above, of thermoplastic material.

According to the present invention a continuous process for the production of a laminate comprises continuously bringing a layer of a non-magnetic metal into contact with a layer of a thermoplastic material and pressing the layers together, the metal layer being heated by means of an induced radio frequency current to a temperature sufficient to cause the thermoplastic material to soften and thus adhere to the metal.

In a preferred method of carrying out the process of the invention the two layers to be united, i.e. the layers of metal and thermoplastic material, are pressed together by passing them into the nip of pressure rollers. The heating current may be induced into the metal layer either before the layers are pressed together, or alternatively, and preferably, at the moment at which the metal layer meets the thermoplastic layer before the layers are pressed together. This is conveniently effected by situating an induction coil within one of the rollers, and the coil may be situated in either of the rollers. Preferably, however, and since the process of the invention involves an effect which is primarily a surface heating effect, the coil is situated within the roller which is adjacent the thermoplastic material. By this means, the R.F. current is induced, via the thermoplastic layer, upon which it has no direct action, into the surface of the metal layer to heat it up instantaneously to the required temperature. It will be appreciated, of course, that the roller within which is situated the coil, must be of a non-conducting material.

It is sometimes desirable to activate the surface of the thermoplastic layer before the layers are pressed together, and we have found that in certain cases this results in a better bond. The thermoplastic surface may be activated, for example, by heating it, by subjecting it to a high frequency corona discharge, or by subjecting it to the action of a polarising gas, such as chlorine or ozone. The heat treatment may involve the use of a flame, for example the thermoplastic material may be passed quickly over a row of gas burners, or it may be carried out by causing the thermoplastic layer to travel in close proximity to or just touching (but not under pressure) the metal layer, and heating the metal layer by an induced R.F. current to a temperature such that it radiates sufficient heat onto the thermoplastic layer to activate the latter.

It will be appreciated that if this latter method is employed it may not be necessary to use a further source of R.F. current within one of the pressure rollers. For example, if the thermoplastic and metal layers are brought very close to each other, i.e. within about 0.01 inch of each other, at a point not more than about 3 inches from the nip of the rollers, and R.F. current is induced into the metal layer at this point such that the surface of the metal adjacent the thermoplastic layer attains a temperature of the order of 200° C., the metal surface will radiate sufficient heat into the thermoplastic surface firstly to activate it and then to soften it so that adhesion takes place as the layers are brought together between the rollers.

By means of the process of the invention it is possible to produce at high speeds laminates from sheets or foils of such non-magnetic metals as tin, aluminium and tin-antimony alloys with sheets or foils of such thermoplastic materials as polyethylene, the material sold under the trade name "Surlyn," polypropylene, polyvinyl chloride, cellulose acetate, polycarbonates, phenoxy resins, polystyrene and styrene copolymers such as A.B.S. Within reason there is no limit on the thickness of the thermoplastic material which may be united with the metal layer, since it is only the surface of the thermoplastic material which it is necessary to cause to soften in order to obtain adhesion. Thus, it is possible to produce a laminate of very thin tin or aluminium foil, e.g. of thickness 0.025 to 0.05 mm., and thermoplastic sheet of, say, ¼ inch or more in thickness.

It is also possible by means of the invention to unite a layer of thermoplastic material to a layer of metal upon which there is already a thin coating of a thermoplastic material. This expedient may be used where it is desired to increase the thickness of the thermoplastic material on a thermoplastic-metal laminate produced by the extrusion coating or roller coating method.

The invention will now be described in more detail with reference to the drawings, wherein FIGS. 1 and 2 are diagrammatic representations of apparatuses for the continuous production of laminates employing the process of the invention;

FIG. 3 is a sectional elevation of a part of a modified apparatus;

FIG. 4 is a diagram of a further modification; and

FIG. 5 illustrates the shape of the induction coil for preferred operation.

With reference to FIG. 1, aluminium foil 1 is continuously passed from a supply roll 2 and polyethylene film 3 is continuously passed from a supply roll 4 between a pair of rollers 5 which bring the foil and film into contact. The foil and film are passed through the field of an induction coil 6 which carries a radio frequency current and by induction heats the foil 1. The film 3 is heated by conduction to a temperature sufficient to soften it, or at least its surface adjacent the foil, and the two components 1 and 3 are united into a laminate 8 by passage through the nip of pressure rollers 7, the laminate being drawn off by any suitable means, e.g. drive rollers.

In the modified apparatus shown in FIG. 2 aluminium foil 11 from supply roll 12 is passed alone through the field of the radio frequency induction coil 16 and is united with polyethylene film 13 from supply roll 14 by means of pressure rollers 17 to form a laminate 18.

With reference to FIG. 3, a continuous length of metal foil 21 is passed around a spring-loaded roller 22 and into the nip of pressure rollers 23, 24, where it contacts a continuous length of thermoplastic film 25 which is passed around a spring loaded roller 26. Rollers 23 and 24 are made of a suitable non-conducting material such as that sold under the trademark "Tufnol," and have a coating 27 of a resilient heat-resisting material such as rubber or cork.

Situated within roller 24, and extending at least the width of the laminate components 21 and 25, is an induction coil 28 which is connected to a source of R.F. current, e.g. between 1½ and 10 kw. at 2 mc./sec., and which heats up the metal layer 21 as it passes in contact with the thermoplastic layer between the rollers 23 and 24. The laminate so formed is drawn off by means of the draw-off rolls 29, pressure being maintained on the laminate as it cools down by twin tension rollers 30 and 31.

In the modified apparatus illustrated in FIG. 4, the metal and thermoplastic layers 21 and 25 are brought into close proximity before they reach pressure rollers 23 and 24 by changing the positions of rollers 22 and 26 so that the layers are spaced apart by approximately 0.01 inch. With this spacing they pass an induction coil 32 which is supplied from an R.F. generator and heats up the metal layer 21. This in turn supplies sufficient heat by radiation to activate the surface of the thermoplastic layer and then to soften the surface sufficiently to cause adhesion.

The position and shape of the induction coil is of importance, since it is preferred, for best results, to achieve a uniform heating of the surface of the metal layer as it passes the coil. A preferred shape for the coil is illustrated in FIG. 5.

The process according to the invention has a number of distinct advantages over prior processes for producing metal-thermoplastic material laminates. Firstly, laminating may be effected at very high speeds, determined only by the rate at which the formed laminate may be drawn off. Secondly, it is possible to apply printing or other decorative matter to the metal foil before it is laminated, since this is not affected by passage of the foil through the high frequency field. Thirdly, laminates having several alternate metal and thermoplastic material layers may be produced with ease. And fourthly, laminates including other materials may be produced. For example, the thermoplastic layer may be associated with a woven or non-woven material, for example paper, cardboard or a textile fabric, or with foam material such as polyurethane foam or P.V.C. foam.

The laminates produced in accordance with this invention may be used in a wide variety of applications. For example, the simple metal-thermoplastic laminates may be used to form sealing membranes for attachment to the mouths of containers by the method described and claimed in our copending patent application No. 50087/64. They may be used for the production of sachets which are employed in the packaging of products where losses by permeability have to be reduced to the minimum; for the vacuum-, pressure- and cold-forming of containers having minimum permeability losses, especially such sachets and containers which are highly decorated; for the manufacture of pouches and the like where a high degree of decoration and/or impermeability is required; and for the production of highly decorated and/or impermeable containers using tin box machinery techniques.

One of the most important features of the laminates produced in accordance with this invention is their impermeability, and it will thus be appreciated that containers made from them, or lined with them, are exceptionally good for packaging contents which tend to leak from containers made from many conventional materials.

The laminates may be used in every branch of the packaging industry, for instance from the wrapping of confectionery, e.g. chocolate bars, to the wrapping of biscuits and cigarettes, and from use as labels for attachment to bottles and other containers to use as backing papers on decorative tiles. The more complex laminates (e.g. metal-thermoplastic-textile fabric) may be used in the production of clothing.

What we claim is:

1. A continuous process for the production of a laminate which comprises continuously bringing a layer of a non-magnetic metal into contact with a layer of a thermoplastic material and pressing the layers together, the metal layer being heated directly by inducing a radio frequency current therein and said heated metal layer, in turn, heating the surface of the layer of thermoplastic material adjacent said metal layer sufficiently to cause the said surface of the layer of thermoplastic material to soften and adhere to the metal layer.

2. A process as claimed in claim 1 wherein the layers are pressed together by means of pressure rollers into the nip of which are passed the said layers.

3. A process as claimed in claim 2 in which the radio frequency current is induced into the metal layer by means of an induction coil situated within one of the pressure rollers.

4. A process as claimed in claim 3 in which the induction coil is situated within the roller adjacent the thermoplastic material.

5. A process as claimed in claim 1 wherein before the layers are pressed together the layer of thermoplastic material is activated.

6. A process as claimed in claim 5 wherein the layer of thermoplastic material is activated by heating it, by subjecting it to a high frequency corona discharge, or by subjecting it to the action of a polarising gas.

7. A process as claimed in claim 6 wherein the layer of thermoplastic material is subjected to a flame treatment before contact with the metal layer.

8. A process as claimed in claim 6 wherein the layer of thermoplastic material is activated by causing it to travel towards the rollers in close proximity to or just touching the layer of metal, and heating the metal layer by means of an induced radio frequency current to a temperature such that it radiates sufficient heat onto the layer of thermoplastic material to activate the layer of thermoplastic material.

9. A process as claimed in claim 1 wherein the metal layer is heated before it is pressed into uniting contact with the thermoplastic material layer.

10. A process as claimed in claim 1 wherein the metal layer is provided, before contact with the thermoplastic layer, with a coating of a thermoplastic material.

11. A process as claimed in claim 1 wherein the layer of thermoplastic material is associated with a layer of a different material.

12. A process as claimed in claim 11 wherein the layer of thermoplastic material is associated with a layer of a woven or non-woven material, or a foam material.

13. A process as claimed in claim 12 wherein the layer of thermoplastic material is associated with a layer of paper, cardboard, polyurethane foam, polyvinyl chloride foam, or a textile fabric.

14. A laminate, whenever produced by the process claimed in claim 1.

References Cited

UNITED STATES PATENTS

| | | | |
|---|---|---|---|
| 2,767,103 | 10/1956 | Loukomsky | 117—46 |
| 2,876,358 | 3/1959 | Root | 156—272 |
| 2,920,173 | 1/1960 | Wastberg | 156—380 |
| 3,146,146 | 8/1964 | Anderson Jr. | 156—272 |

CARL D. QUARFORTH, Primary Examiner

S. HELLMAN, Assistant Examiner

U.S. Cl. X.R.

156—273, 380; 117—93.2